United States Patent
Karasawa et al.

Patent Number: 5,278,680
Date of Patent: * Jan. 11, 1994

[54] PROJECTION TYPE LIQUID CRYSTAL DISPLAY SYSTEM AND METHOD OF POLARIZED LIGHT COMPONENT PROJECTION

[75] Inventors: Johji Karasawa; Junichirou Shinozaki, both of Suwa, Japan

[73] Assignee: Seiko Epson Corporation, Japan

[*] Notice: The portion of the term of this patent subsequent to Apr. 6, 2010 has been disclaimed.

[21] Appl. No.: 968,696

[22] Filed: Oct. 30, 1992

Related U.S. Application Data

[63] Continuation of Ser. No. 593,107, Oct. 5, 1990, Pat. No. 5,200,843.

[51] Int. Cl.$^5$ ............................................. G02F 1/13
[52] U.S. Cl. .................................... 359/40; 359/63; 359/70; 353/81; 353/98; 358/60
[58] Field of Search ................... 359/40, 48, 63, 70, 359/495, 496, 497; 353/33, 20, 81, 98, 122; 358/60, 61, 231

[56] References Cited

U.S. PATENT DOCUMENTS

| | | | |
|---|---|---|---|
| 4,989,076 | 1/1991 | Owada et al. | 359/70 |
| 5,028,121 | 7/1991 | Baur et al. | 359/63 |
| 5,172,254 | 12/1992 | Atarashi et al. | 359/40 |

Primary Examiner—Rolf Hille
Assistant Examiner—Minhloan Tran
Attorney, Agent, or Firm—W. Douglas Carothers, Jr.

[57] ABSTRACT

A projection type liquid crystal display (LCD) system having a light source, a light separation device for separating light from the light source into color components, a liquid crystal light valve for modulating light from the light separation device, a light synthesizing device for synthesizing the modulated light from the liquid crystal light valve, and a projection lens for projecting light from the light synthesizing device. A polarizing beam splitter is arranged in the optical path between the light source and the light separation device to separate the incident light into two polarized light components having perpendicular polarization directions relative to each other and a polarizing conversion device converts the separated polarized light components to have the same polarization direction and transmits them from the conversion device in spatial parallel relation to the liquid crystal light valve.

13 Claims, 7 Drawing Sheets

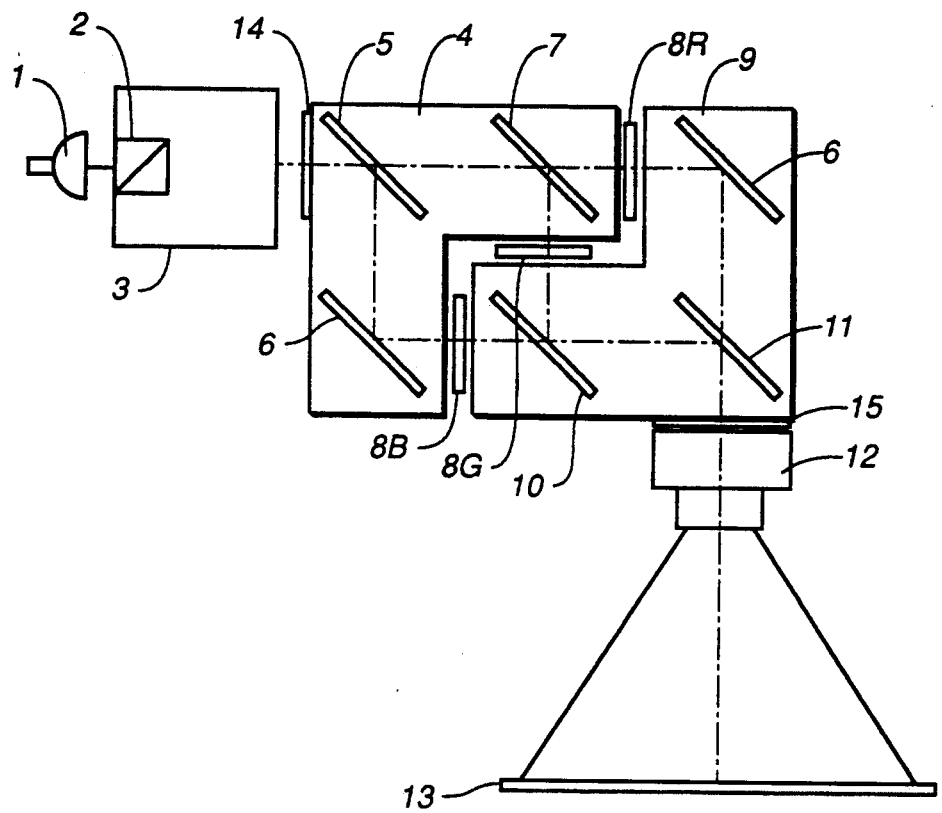
FIG._1

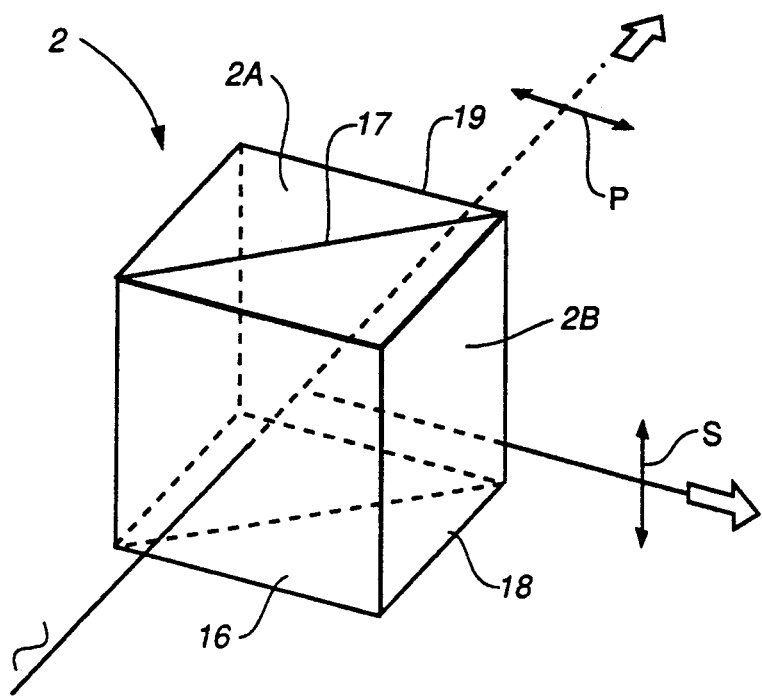
FIG._2
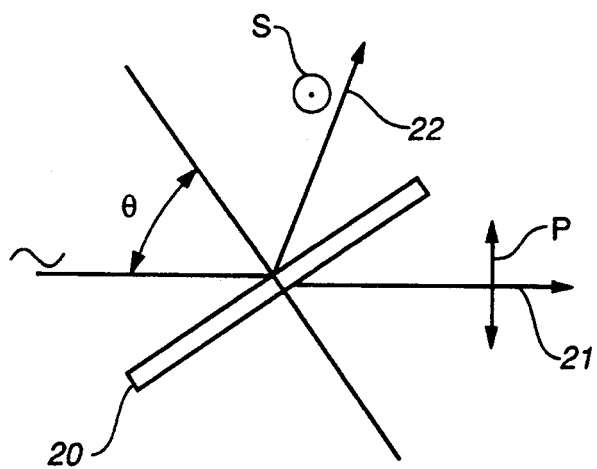
FIG._3

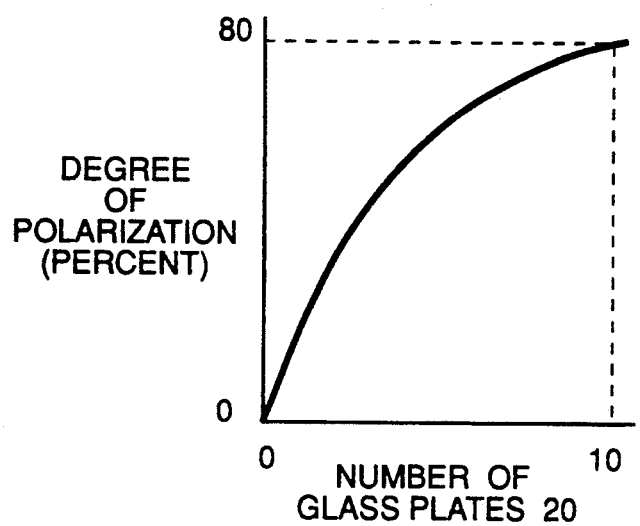
FIG._4
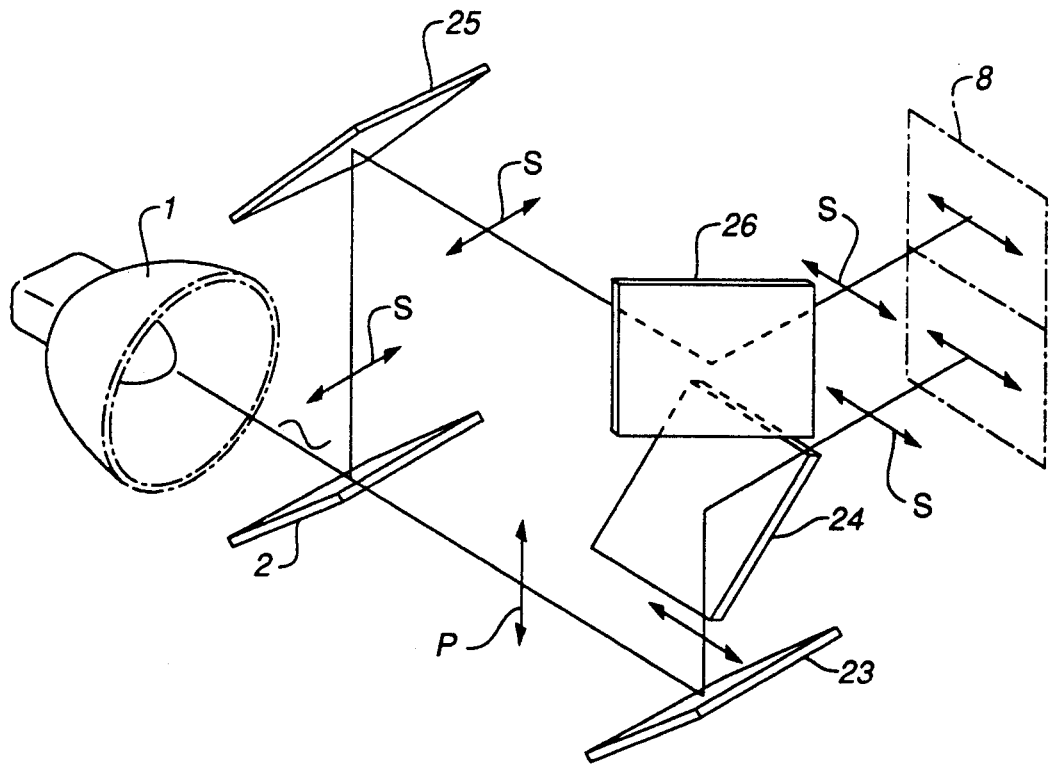
FIG._5

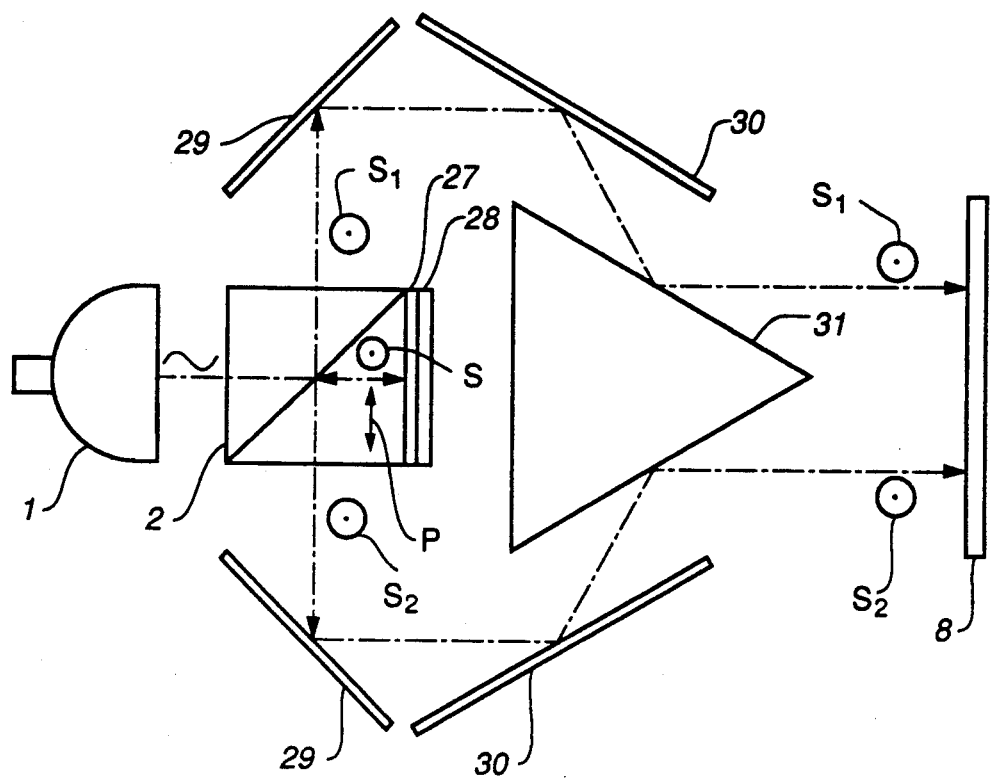
FIG._6
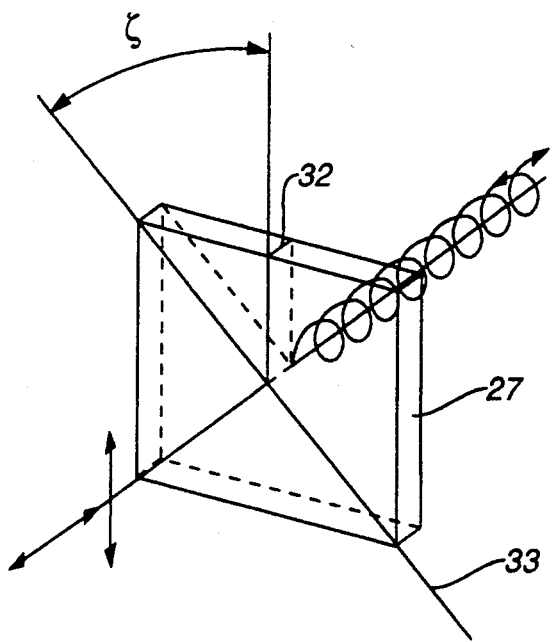
FIG._7

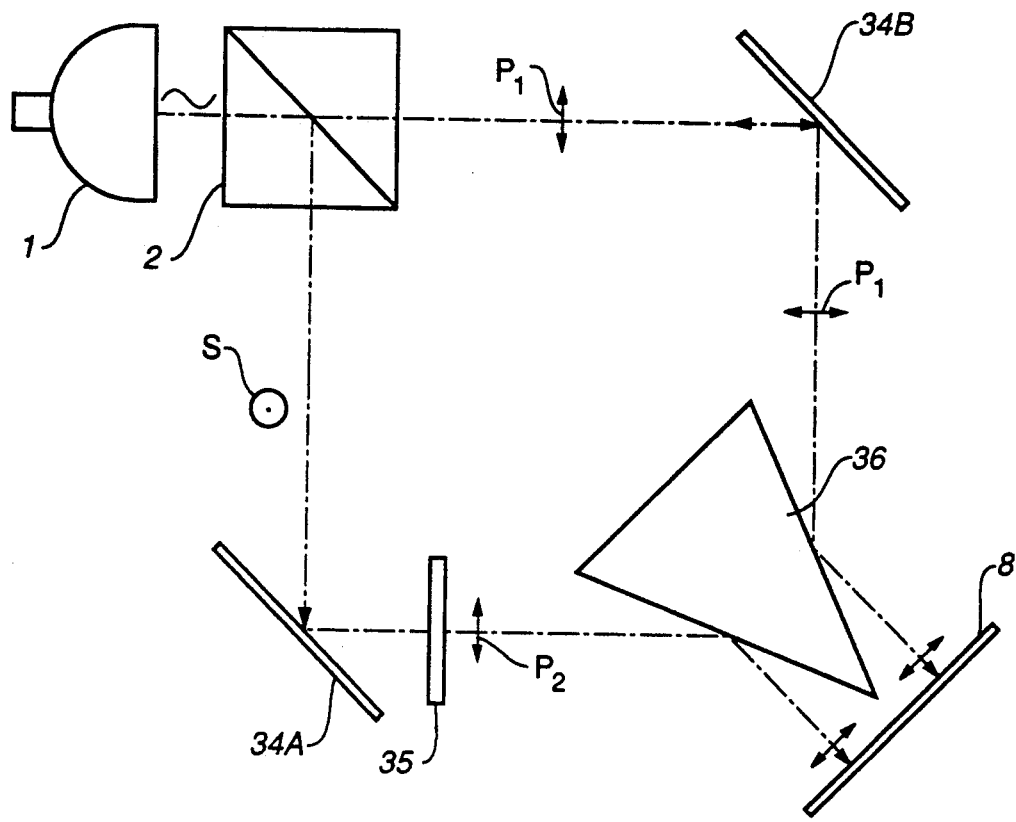
FIG._8
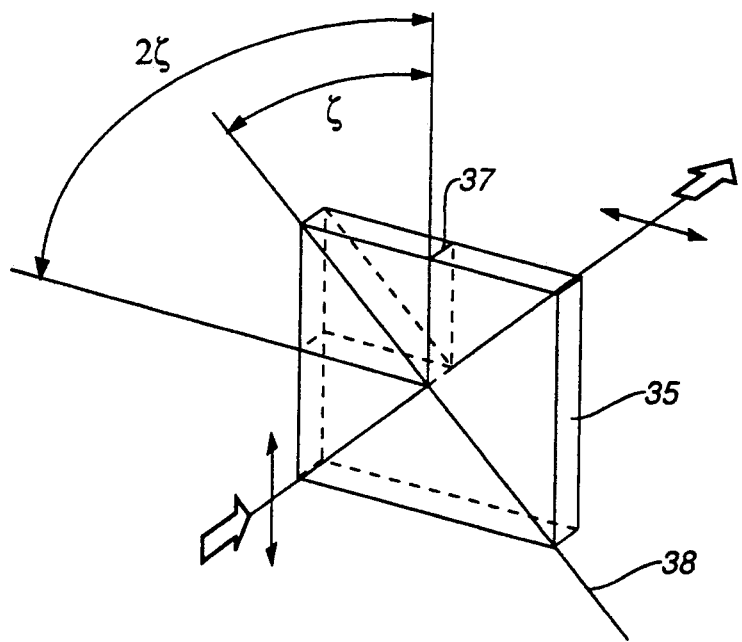
FIG._9

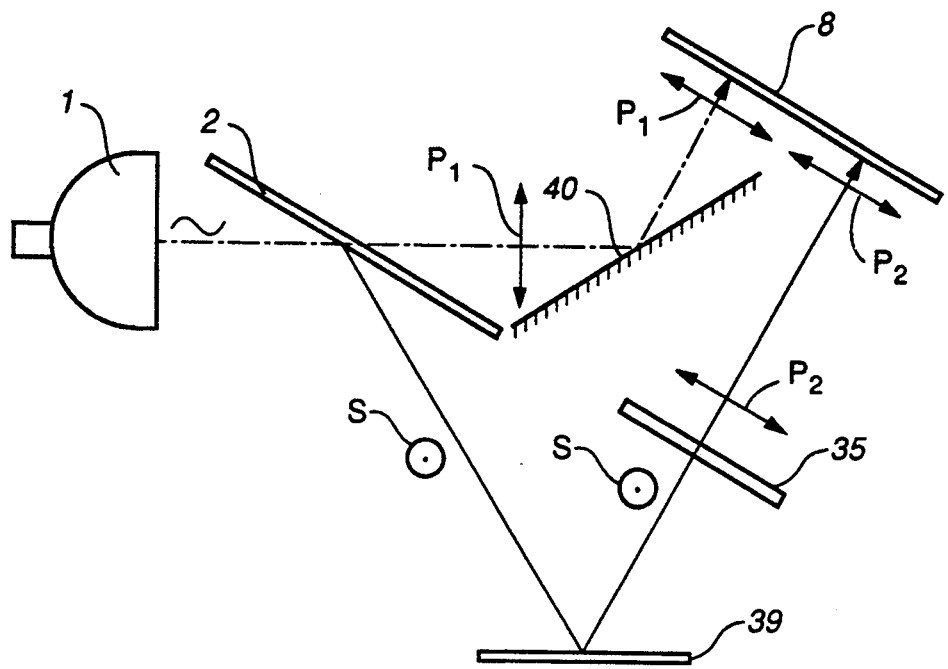
FIG._10
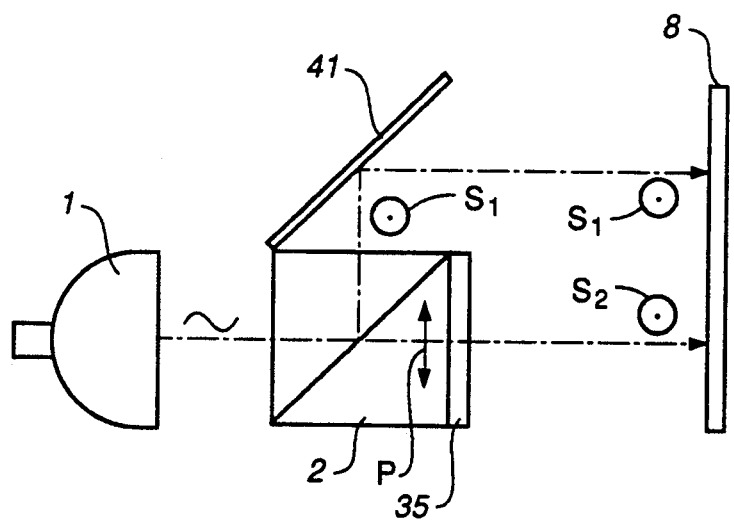
FIG._11

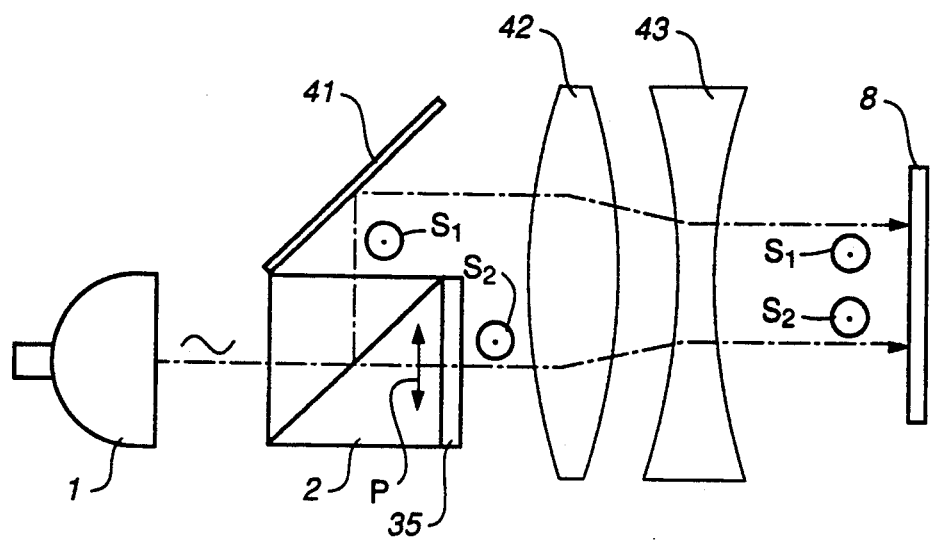
FIG._12
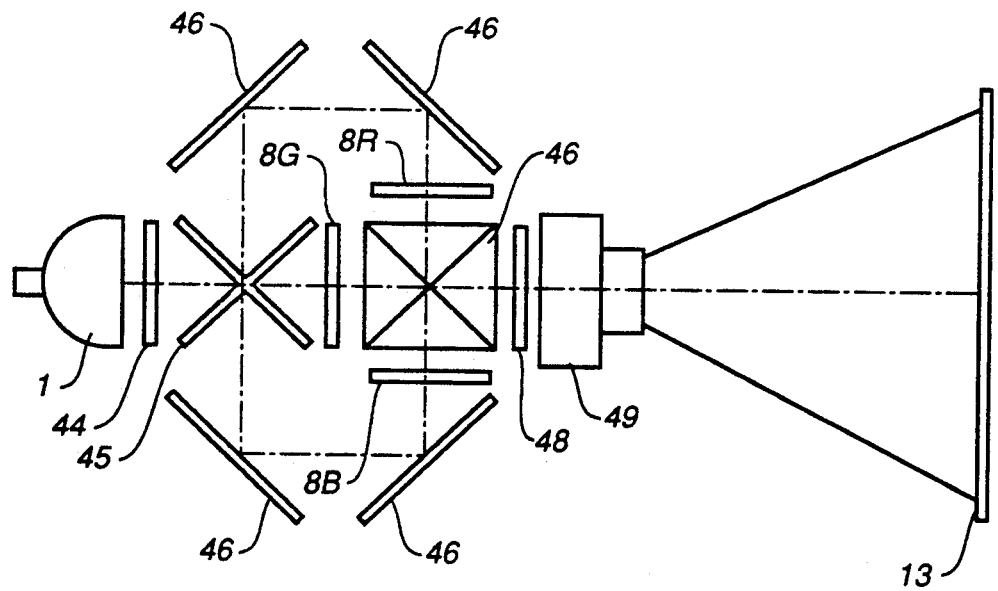
FIG._13
(PRIOR ART)

PROJECTION TYPE LIQUID CRYSTAL DISPLAY SYSTEM AND METHOD OF POLARIZED LIGHT COMPONENT PROJECTION

This is a continuation of application Ser. No. 07/593,107 filed on Oct. 5, 1990, now U.S. Pat. No. 5,200,843.

BACKGROUND OF THE INVENTION

This invention relates generally to a projection type liquid crystal display (LCD) system, such as projection video or television systems, and more particularly to a polarization converter for projection type LCD systems and the optical arrangement or optics system for projection type LCD system that provides for enhancement of the brightness in the system without increase in power consumption.

FIG. 13 illustrates a conventional projection type liquid crystal display, which figure is taken from Japanese Patent Laid-Open No. 63-185188. In FIG. 13, front linear polarizer 44 receives a light from a white light source 1 to select a linearly polarized light component between either the P-polarized light component and a S-polarized light component. Linearly polarized light is required for the illumination optics of the liquid crystal optics system. Spectroscopic dichroic mirror 45 separates light transmitted from polarizer 44 into the three primary colors of red, green and blue. The red color component, R, is directed in a straight path and then reflected by light reflectors 46. The green light component, G, is directed in a straight path without any change in direction. The blue light component, B, is directed in a straight path and then reflected by light reflectors 46. The three light components are light-modulated by respective liquid crystal light valves 8R, 8G and 8B. Dichroic prism 47 synthesizes the modulated light beams and then directs the beams onto rear linear polarizer 48. Polarizer 48 reselects the desired polarized light component, such as the S component, to obtain a resultant picture image that is enlarged by projection lens 49 onto projection screen 13.

In this type of conventional projection type liquid crystal display system, 50% or more of the light from light source 1 transmitted through polarizer 44 will be absorbed and lost, i.e., one polarized light component will be selected from the light and transmitted through polarizer 44 while the other polarized light component is absorbed in polarizer 44. Moreover, the necessary and desired level of brightness for such an LCD system cannot be provided with polarizer 44 having even 80% transmittance in spite of the employment of a light source having a high luminance intensity. As a result, the low light utilization efficiency of the light sources in such projection type LCD systems results in a dark projection screen which is not commercially acceptable to consumers.

Furthermore, polarizer 44 placed in close proximity to light source 1 is affected by heat absorption, which hinders the stable reliability of the projection type liquid crystal display under a wide range of ambient operating temperatures as well as may deform the shape of the polarizer. A high revolution type cooling fan with high cooling capability is, therefore, required to retain the stable reliability of the system. However, such high revolution type cooling fan generates considerable system noise and vibration so that a high resolution projection type LCD system commercially applicable for the consumer use cannot be achieved with good results.

More recently, polarization converters have been suggested for use in liquid crystal projectors wherein both polarization light components are brought into the same polarization direction by means of several prisms. See, for example, M. Imai et al., "Polarization Converter for Very Bright Projections Optics System of Liquid Crystal Projector", Institute of Electronics, Information and Communication Engineers, Part 5, 1989 Autumn National Convention Record, page 5-34, September, 1989 (published by Electronics). However, such prism systems are complex, difficult to assemble, competitively expensive and can lack compactness relative to the desired size of optics systems for a LCD projector system.

Thus, there is a need to develop brighter projection type LCD systems using compact optic elements and providing enhanced commercial applicability relative to cost, reliability and resultant image resolution and clarity.

It is an object of this invention to enhance the brightness of projection type LCD systems without increasing the system power consumption.

It is another object of this invention to provide for enhanced use of a light source employed in a projection type LCD system.

It is another object of this invention to provide a polarization converter for efficiently utilizing the light intensity of a light source in a projection type LCD system.

It is another object of this invention to provided an optics arrangement in a projection type LCD system that brightens the projected image created by the system optics while reducing the power consumption necessary for operation of the projection type LCD system.

It is another object of this invention to provide a projection type LCD system which is able to produce a high intensity picture image by utilizing maximum light flux from the light source, to provide high reliability under a wide range of ambient temperatures, and to achieve sufficiently low level noise and vibration rendering the system highly applicable for commercial audio/video projection type systems.

SUMMARY OF THE INVENTION

According to this invention, a projection type liquid crystal display system comprises a light source, a light separation means for separating light from the light source, a liquid crystal light valve for modulating light from the light separation means, a light synthesizing means for synthesizing the modulated light from the liquid crystal light valve, and a projection lens for projecting light from the light synthesizing means, wherein a polarizing beam splitter is arranged between the light source and the light separation means to separate an incident light into two liner polarized orthogonally disposed light components, and a polarizing conversion means for converting both of the polarized light components into the same polarization direction and for irradiating them both in substantially parallel orientation. The polarizing conversion means may be comprised of a light reflector a λ/4 plate, or a λ/2 plate. A wedge type reflector may be employed to irradiate both light components of identical polarization direction in parallel. Thereafter, the parallel components are converged and re-collimated via a lens system to form a smaller cross sectional area for projection onto the light separation means. As a result, the aperture of the liquid crystal light valve can be reduced to accommodate the reduction in component cross sectional area.

A distinct advantage of the polarizing conversion means of this invention as it particularly relates to the previously mentioned multiple prism system of Imai et al. is the provision of two polarized light components of the same polarization direction are irradiated in parallel onto to respective half areas of the aperture of a liquid crystal light valve, and, further, is limited to the employment of a prism arrangement without contemplation of a λ/4 plate or a λ/2 plate as polarizing conversion means in the optics systems of a LCD projector system. The projector system of Imai et al. provides for two polarized light components to be combined as a single overlapped component beam. In such a structure, the light beam, or at least one polarized light component, should be irradiated at an oblique angle relative to the planar surface of the liquid crystal light valve. However, contrast and brightness are deteriorated in such a projector system since the light beam is irradiated obliquely onto the light valve. In the present invention, optimum contrast and highest brightness are achieved because the two polarized light components are irradiated onto the light valve in side-by-side or abutting, parallel relationship and perpendicular to the planar surface of the light valve.

The projection type LCD system of this invention comprises a cubic polarizer having a pair of right angled prisms arranged as a polarizing beam splitter with a dielectric laminated coating applied to the sloped surfaces of the prisms each having layer and these surfaces thereafter secured together. Alteratively, the polarizer may be comprised of a single glass plate or a plurality of glass plates laminated together in parallel and arranged to a polarization angle with respect to the incident angle of light entering the polarizer.

In a liquid crystal display system with the foregoing structure, in case a cubic polarizer is used as a polarizing beam splitter, light is irradiated at 45° with respect to the sloped surface coated with a dielectric laminated coating layer, whereby the incident light can be separated into a P-polarized light component and an S-polarized light component with more than 98% precision attained. In another case where the laminated glass plate is utilized as a polarizing beam splitter and formed so that a light incident angle is so fixed as to be equal to a polarization angle, the polarizing beam splitter transmits 100% of the P-polarized light component and reflects the S-polarized light component in accordance with a plurality of laminated glass plates so that the incident light can be accurately separated into P-polarized light and S-polarized light.

Both of the separated and polarized light components are oriented geometric optically by a light reflector or by passing the components through either one of λ/4 plate or λ/2 plate, so that both components have the same polarization direction for projection onto a liquid crystal light valve to form a modulated picture image. Any intensity variation between the respective identical polarization oriented components is substantially equalized by substantially the distances to the liquid crystal light valve from the separated P- and S-polarized light components, which is realized by using a wedge type light reflector.

As previously indicated, a polarizing beam splitter separates incident light from a light source into P- and S-polarized light components which are transmitted substantially in parallel so that the illuminated area after the parallel irradiation becomes twice that of before the separation. Both of the polarized light components after the parallel irradiation are converged and re-collimated with a combination of a convex lens and concave lens so that a smaller apertured liquid crystal light valve can condense light from a larger light source with the overall result of greater utilization of substantially all of the light flux from the light source.

More effective utilization of the light flux from a light source can be realized if both resultant polarized light components are arranged to irradiate half of the aperture of the liquid crystal light valve.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic plan view illustrating an optical arrangement in accordance with one embodiment of this invention.

FIG. 2 is an perspective view a cubic polarizer comprising a pair of right angled prism for utilization in this invention.

FIG. 3 is a schematic view for illustrating the principle of operation of a polarizing beam splitter employing a glass plate.

FIG. 4 is a graphic illustration of the relationship between the number of glass and polarized degree in a polarizing beam splitter employing a glass plate.

FIG. 5 is a perspective view of another embodiment of this invention employing a polarizing conversion means in the form of light reflectors.

FIG. 6 is a schematic view illustrating another embodiment of this invention employing a polarizing conversion means in the form of a λ/4 plate.

FIG. 7 is a schematic view for illustrating the principle of operation of a λ/4 plate.

FIG. 8 is a schematic view illustrating another embodiment of this invention employing a polarizing conversion means in the form of a a λ/2 plate.

FIG. 9 is a schematic view for illustrating the principle of operation of a λ/2 plate.

FIG. 10 is a schematic diagram illustrating another embodiment of this invention employing a λ/2 plate polarizing conversion means.

FIG. 11 is a schematic view illustrating a further embodiment of this invention employing a λ/2 plate polarizing conversion means.

FIG. 12 is a schematic view illustrating another embodiment of this invention employing a combination lens behind the polarizing conversion means in the embodiment of FIG. 11.

FIG. 13 is a schematic view of a conventional projection type liquid crystal display.

DESCRIPTION OF THE PREFERRED EMBODIMENTS

Reference is now made to FIG. 1 wherein there is illustrated a diagram of an optical arrangement or optics system according to one embodiment of this invention. In FIG. 1, light source 1 is a multi-color lamp, such as, a halogen lamp, xenon lamp, and metal halide lamp. Polarizing beam splitter 2 receives light from light source 1 and permits the passage of the P-polarized light component through splitter 2 and reflects the S-polarized light component via the reflective surface of polarizing beam splitter 2. Polarizing conversion means 3 receives both the P- and S-polarized light components from beam splitter 2 and recombines them as parallel components of either P-polarized light component or S-polarized light component for transmission into light separation means 4. Blue color reflective dichroic mirror 5 in light separation means 4 receives both polarized light components and reflects the blue color light (having a wavelength less than 500 nm) to reflector or mirror 6A and transmits all other colored components of light, e.g., yellow. Light reflector 6 redirects the blue color light to blue color liquid crystal light valve 8B. The remaining light is transmitted through dichroic mirror 5 and received at dichroic mirror 7 which reflects green color light (having a wavelength between about 500 nm to about 600 nm), and transmits red color light (having a wavelength more than about 600 nm). The reflected green color light enters green liquid crystal light valve 8G while the transmitted red color light enters red liquid crystal light valve 8R. Liquid crystal light valves 8R, 8G and 8B optically modulate the respective color lights to form a picture image for each of these colors in response to the amplitude of applied signal voltages representing analog picture information. Liquid crystal light valves 8R, 8G and 8B perform a shutter function for controlling the transmittance of incident light on the light valves. In addition to an active matrix liquid crystal panel and a simple matrix liquid crystal panel, the liquid crystal panel may be of the type which varies the transmittance in response to signal voltages.

Liquid crystal light valves 8R, 8G and 8B optically modulate the color lights to input light synthesizing means 9. The blue colored light transmits through the blue color transmitting dichroic mirror 10 and then is reflected by the red color transmitting dichroic mirror 11. The green colored light is reflected by the blue color transmitting dichroic mirror 10 and red color transmitting dichroic mirror 11. The red colored light is reflected by the light reflector 6 and then is transmitted to red color transmitting dichroic mirror 11. The projection lens 12 receives multi-color synthesized light and enlarges the image for display onto front screen 13. The liquid crystal light valves 8R, 8G and 8B can be physically rearranged with their corresponding dichroic mirrors to obtain the light separation and the light synthesis in the same manner as described above.

The liquid crystal light valves 8R, 8G and 8B are able to display a picture image by selecting the polarized light component employing input and output polarizers 14 and 15. However, polarizing beam splitter 2, which has nearly 100% degree of polarization, does not require polarizer 14 because polarizer 14 is basically an auxiliary polarizer for polarizing beam splitter 2.

FIG. 2 illustrates a polarizing beam splitter that be employed with this invention and comprises a cubic polarizer constructed from a pair of right angled prisms 2A and 2B. A dielectric layer 17, formed by laminating alternating coatings of a high refractive index material and a low refractive index material, is coated on the sloped or angular surfaces of both right angled prisms 2A and 2B. Examples of low refractive index material are $Na_3AlF_6$, $MgF_2$ or $SiO_2$. Examples of high refractive index material are MgO, $TiO_2$, $ZrO_2$ or ZnS. The employment of these materials and combination of alternating layers of such materials depends on the material employed for prisms 2A and 2B. The structure is then completed by cementing or otherwise securing the prism sloped surfaces together with dielectric layer 17 sandwiched therebetween.

As shown in FIG. 2, non-polarized light enters prism 2B perpendicular with respect to the plane of outer surface 16 or at 45° angle with respect to dielectric laminated coating layer 17 at the prism interface. The light is separated into a P-polarized light component and an S-polarized light component, each of which have the same irradiations areas as the original light and, further, have polarization orientations perpendicular to each other, at dielectric laminated coating layer 17. The two components are separately emitted separately from respective surfaces 18 and 19 of the cubic polarizer at an accurate angle of 90°, i.e., the incident light beam which enters at a polarization angle at the interface containing laminated layer 17 passes through layer 17 without reflection as the P-polarized light component as shown in FIG. 2. Although the S-polarized light component is reflected partially at each of the interfaces formed by the laminated dielectric coatings comprising layer 17, the total reflectance of the S-component is above 98% because of the multiple reflecting interfaces formed in layer 17. Therefore, when the cubic polarizer is employed for polarizing beam splitter 2, it is not necessary to employ polarizer 14 shown in FIG. 1.

FIG. 3 is a principle of a polarizing beam splitter comprising a glass plate to be described in the next embodiment of this invention, and the principle is similar to that illustrated in FIG. 2. In FIG. 3, glass plate 20 has a thickness of about 1 mm and is arranged to have the following condition:

$$\theta = \tan^{-1}(n_2/n_1)$$

where $n_2$ is a refraction index of the glass plate 20, $n_1$ is a refraction index of the medium before incident light, and $\theta$ is the angle of incident light. Substantially 100% of the P-polarized light component 21 will pass through plate 20 and about 15% of the S-polarized light component 22 is reflected so that $\theta$ in this case is the polarization angle. Hence, in case of employing a plurality of glass plates 20 laminated together in parallel, ideally 100% of the P-polarized light component 21 is transmitted through the laminated plates and 100% of the S-polarized light component 22 is reflected by the laminated plates.

FIG. 4 illustrates the relationship between the number of glass plates 20 along the abscissa axis and the degree of polarization along the ordinate axis obtained by actual measurements. About 80% degree of polarization can be achieved with eight to ten glass plates and a polarizer 14 shown in FIG. 1 absorbs 30% of the S-polarized light component so that the temperature rise relative to polarizer 14 can be minimized.

In FIG. 5 polarizing conversion means 3 comprises a light reflector. In FIG. 5, polarizing beam splitter 2 separates light from the light source 1 into a P-polarized light component, which is transmitted light and a S-polarized light component, which is reflected light. The travel direction and the polarization orientation of the P-polarized light component is converted by light reflectors 23 and 24. The travel direction of the S-polarized light component is changed by light reflectors 25 and 26. These two light components travel substantially in the same direction and in parallel with each other and are converted into polarized lights having the same polarization direction or orientation and are transmitted in parallel to a liquid crystal light valve 8, i.e., each polarized light which is separated into P- and S-polarized light components can be emitted substantially in parallel by orientation of the beam travel direction and the polarization direction through the use of a combination of the geometric optical reflective devices. Both of the polarized light components are illuminated in spatial relation to the aperture of liquid crystal light valve 8, as illustrated in FIG. 5.

In this embodiment as well as the following several embodiments to be described, either a cubic polarizer or a glass plate polarizer may be selected for polarizing beam splitter 2. After the spatial parallel emission of the dual polarized light components, the picture image is produce in the manner previously described for the projection of the image onto screen 13.

FIG. 6 discloses another embodiment for polarizing conversion means 3 according to this invention employing a $\lambda/4$ plate. Polarizing beam splitter 2 separates light from light source 1 into a P-polarized light component, which is transmitted through beam splitter 2 and a S-polarized light component, $S_1$, which is reflected at the interface of beam splitter 2 directly onto mirror 29. $\lambda/4$ plate 27 on the forward end of beam splitter 2 transmits the P-polarized light component and converts this component of linear polarized light into circular polarized light. Front reflection means 28 reflects the circular polarized light to reverse its direction of propagation. Next, the reflected circular polarized light is re-converted into linear polarized light by its re-transmission through $\lambda/4$ plate 27. As a result, these conversions, the linear of straight line polarization orientation has been converted into a S-polarized light component, $S_2$, which is perpendicular to the originally linear polarized light, P, prior to entering into $\lambda/4$ plate 27, and then goes back to the polarized light beam splitter 2. S-polarized light component, $S_2$, which goes back through polarizing beam splitter 2 is deflected at the reflective interface of polarizing beam splitter 2 and then reflected by wedge type light reflector 31 after repeated directional reflections with reflection means 29 and 30. On the other hand, the S-polarized light component, $S_1$, which was initially reflected at the reflective interface of polarizing beam splitter 2 is reflected by corresponding reflection means 29 and 30 onto wedge type light reflector 31. S-polarized light component, $S_1$, is then reflected by wedge type light reflector 31 and together with S-polarized light component, $S_2$, are formed by wedge reflector 31 as spatially disposed, parallel beams into the aperture of liquid crystal light valve 8. Wedge type light reflector 31 is formed of a wedge type body of a metal such as aluminum, stainless steel, and a high reflection mirror coating such as metal coating and a dielectric laminated coating layer are formed on the surface of the body.

FIG. 7 is a diagrammatic view for the purpose illustrating the functional principle of $\lambda/4$ plate 27. When an angle, $\zeta$, is made by both linear polarized plane surface 32 of incident light and crystal light axis 33 of $\lambda/4$ plate 27 is 45°, $\lambda/4$ plate 27 converts the incident linear polarized light into a circular polarized light or vice versa.

FIG. 8 discloses another embodiment for polarizing conversion means 3 according to this invention employing a $\lambda/2$ plate. Polarizing beam splitter 2 separates the light from light source 1 into a P-polarized light component comprising transmitted light through the beam splitter as P-polarized light component, $P_1$, and a S-polarized light component comprising reflected light from the beam splitter. Light reflector 34A deflects the reflected S-polarized light component and $\lambda/2$ plate 35 rotates the polarized light plane 90° to produce P-polarized light component, $P_2$. P-polarized light component, $P_1$, is reflected by reflector 34B, and both P-polarized light component, $P_1$, and P-polarized light component, $P_2$, are deflected in in spatial parallel relationship by means of wedge type light reflector 36. Wedge type light reflector 36 irradiates the two spatially, parallel P-polarized light components, $P_1$ and $P_2$, onto the aperture of liquid crystal light valve 8.

In order to transmit substantially in parallel both polarized light components, $P_1$ and $P_2$, oriented into a single polarized light component, P, $\lambda/2$ plate 35 may be arranged in the light path of the S-polarized light component, S, prior to light reflector 34A, or $\lambda/2$ plate 35 may be arranged in the light path of the P-polarized light component, P, prior to or after light reflector 34B, in case where spatially parallel S-polarized light components, $S_1$ and $S_2$, are to be achieved.

In connection with this embodiment, the employment of wedge type light reflector 36 is similar to that of the embodiment of FIG. 6. In both of these embodiments, the light path length from polarizing beam splitter 2 to liquid crystal light valve 8 are substantially equal for both polarized light components. Also, the geometric configuration of the optics system employing wedge type light reflectors 31 and 36 provides for substantially equal as well as the shortest light path length relative to both of the oriented polarized light components. Furthermore, the wedge type light reflector 31 and 36 are provided with an acute apex 31A or 36A so that the side wall mirror surfaces can place the parallel polarized light components on the aperture of liquid crystal light valve 8 with no unobjectionable blank portion or spacing between the side-by-side component beams. In the case where such surfaces are flat plate mirrors, for example, positioned in angular relation conforming to the angle of apex 31A or 36A, there will be a blank portion or spacing between adjacently disposed components, which spacing is caused by the thickness of the flat mirrors themselves, and is unacceptable in forming the resultant image. The use of a wedge type light reflector 31 or 36, therefore, prevents the occurrence of these blank portion between the adjacently disposed, parallel component beams. The parallel alignment of the component beams to valve 8 is handled by angular adjustment of mirrors 30 or 34. Therefore, the wedge type light reflector is effectively utilized to accomplish a highly bright, uninterrupted and uniformly projected picture image with reduced unevenness in beam intensity.

FIG. 9 is a diagrammatic view for the purpose illustrating the functional principle of the $\lambda/2$ plate 35. When the angle $\zeta$, which is construed by linear polarizing planar surface 37 of the incident light and crystal light axis 38 of $\lambda/2$ plate 35, is 45°, $\lambda/2$ plate 35 rotates the polarization planar direction of the incident linear polarized light by 90°, as shown in FIG. 9, so that the P- or S-polarized light component is converted to an S- or P-polarized light component.

FIG. 10 discloses another embodiment for polarizing conversion means 3 according to this invention employing $\lambda/2$ plate 35. Polarizing beam splitter 2 comprises a plate and separates light from light source 1 into a P-polarized light component, $P_1$, which is transmitted through the beam splitter, and a S-polarized light component, S, which is reflected from the surface of the beam splitter. Reflector 39 redirects the reflected S-polarized light component, S, into λ/2 plate 35, which rotates the polarized light planar direction by 90°, as previously exemplified in FIG. 9, converting the S-polarized light component, S, into P-polarized light component, $P_2$, which travels in a direct straight line into the aperture of liquid crystal light valve 8. P-polarized light component, $P_1$, transmitted through beam splitter 2, is reflected by reflector 40 at an appropriate deflection angle to the aperture of liquid crystal light valve 8. Thus, both P-polarized light components, $P_1$ and $P_2$, are irradiated in parallel, spatial relation and perpendicular to the surface of light valve 8.

According to this embodiment, in order to project substantially in parallel both of polarized light components oriented respectively in a single polarization direction and orientation, λ/2 plate 35 may be arranged either in front of the light reflector 39, or in front or in rear of the light reflector 40. The present embodiment is better in comparison with that in FIG. 8 in that a simpler optics system is employed comprising only two light reflectors 39 and 40, beside plate beam splitter 2 and λ/2 plate 35, to produce the spaced parallel P- or S-polarized light components derived from substantially the total light from light source 1.

FIG. 11 discloses still another embodiment for polarizing conversion means 3 according to this invention employing λ/2 plate 35. Polarizing prism beam splitter 2 separates the light from light source 1 into a P-polarized light component, P, which is transmitted through the prism beam splitter, and a S-polarized light component, $S_1$, which is reflected at the interface of the prism beam splitter. λ/2 plate 35 is arranged relative to the face of prism beam splitter 2 that receives the exiting P-polarized light component, P, i.e., λ/2 plate 35 may be cemented to this exiting face or may be aligned in spaced relation thereto and in the path of the exiting P-polarized light component, P. The transmitted P-polarized light component, P, is rotated 90° relative to its polarized plane surface after passing through λ/2 plate 35 and is thereby converted into a S-polarized light component, $S_2$, which travels in a direct straight line into the aperture of liquid crystal light valve 8. S-polarized light component, $S_1$, reflected by polarizing prism beam splitter 2, is reflected by light reflector 41 in the same or parallel direction as S-polarized light component, $S_2$, so that both components, $S_1$ and $S_2$, are separately projected onto the aperture of light valve 8. In this case, a similar function can also be achieved by arranging λ/2 plate 35 in the light path of the S-polarized light component, $S_1$. It can be seen that the optics system of this embodiment comprises a total of three components, beam splitter 2, reflector 42 and λ/2 plate 35, and is, therefore, the simplest construction compared with the embodiments of FIGS. 8 and 10.

In FIG. 12, the optics system of FIG. 11 is together with a combination of convex lens 42 and concave lens 43 arranged after polarizing conversion means 3 of FIG. 11. This same lens combination may be employed with any one of the other embodiments of this invention. With respect to each of the previously discussed prior embodiments, the vertical cross area of the light emitted in parallel from the polarizing conversion means 3 is approximately twice that of the light from the light source 1. Therefore, in order to effectively utilize the light from light source 1, the aperture area of liquid crystal light valve 8 is required to be enlarged to be substantially twice as large as the vertical cross area of the emitted light from light source 1. In this manner, the present invention provides a bright and compact liquid crystal display system by employing a smaller liquid crystal light valve in combination with a larger light source. In other words, the lens system comprising convex lens 42 and concave lens 43 permit the use of a larger light source 1 with a smaller light valve 8 wherein the size of the aperture at valve 8 depends upon the combination and condition of lenses 42 and 43, as illustrated in FIG. 12.

In particular, the spatial, parallel polarized light components having the same polarization direction from the polarizing conversion means 3 are condensed or converged by convex lens 42 and then is re-collimated by concave lens 43. As a result, the light emitted from concave lens 43 is converted into a parallel light beam with a small cross sectional area in comparison with the light beam entering convex lens 42 and these separated beams can be separately irradiated onto a smaller liquid crystal light valve 8. Further, since the aspect ratio of liquid crystal light valve 8 is 4:3 or 16:9 relative to foregoing embodiments, a liquid crystal light valve 8 having an elongated aperture is more effective in utilizing the respective parallel polarized light components which are arranged by the optics system to irradiate onto respective half areas of the aperture of light valve 8. By irradiating both polarized light components in side-by-side relation on respective aperture halves of valve 8, an improved illumination ratio of the picture image as well as a brighter picture image are achieved.

As described in connection with the foregoing embodiments, practically all the light flux generated from light source 1 can be properly converted relative to desired polarization direction and orientation and provided to the aperture of liquid crystal light valve 8. Light source 1 and polarizer 14 in FIG. 1 are arranged at a desired relational distance and polarizer 14 is out of the influence of heat generated from the absorption of another polarized light component. A cooling fan with a low RPM rating can provide for stable reliability and operating conditions of the system over a wide range ambient temperature. Therefore, a cooling fan with a high RPM rating providing for high cooling capability is not required in the embodiments of the present invention. Relative to stabilized operation under stabilized temperature condition, it is preferable to provide an optical arrangement or optics systems that does not employ polarizer 14.

In summary, the projection type LCD system according to this invention is constructed in the manner so that the light emitted from a light source is separated into a P-polarized light component and a S-polarized light component by a polarizing beam splitter, and the polarized light components are then converted to have the same polarizing direction and result in substantially parallel, spatially separated component beams. The separately projected, parallel component beams are then transmitted to the aperture of a liquid crystal light valve, which is modulated to form a picture image for projection on a screen whereby substantially all of the light transmitted from the light source will be incident on the aperture of the liquid crystal light valve so that a high intensity picture image can be realized due to the utilization of the maximum light flux from the light source.

Furthermore, since the incident-side polarizer 14 is placed at a proper distance relative to the light source and is out of the heat influence caused by the absorption of the other polarized light component that would normally have a different polarization direction, a cooling fan with a low RPM rating satisfactorily performs the cooling function resulting in an improved projection type LCD system having stable reliability under a wide range ambient operating temperatures and, therefore, highly applicable for commercial audio and video systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A polarizing conversion and synthesizing means in an optical path for converting two polarized light components of different polarization direction into polarized light components having identical polarization direction for presentation of an objective plane comprising
    a beam splitter to separate incident light from a light source into two polarized light components each having different polarization directions and different optical component paths,
    polarizing changing means positioned in one of said component optical paths of one of said polarized light components to orient said one polarized light component to have the same polarization direction as the other of said polarized light components in the other of said component optical paths,
    mirror means in each of said component optical paths to reflect both of said polarized light components in side-by-side, parallel relationship onto said objective plane with said polarized light components incident therewith, and
    wherein the length of said component optical paths traversed by each of polarized light components between said light source and said objective plane are substantially identical.

2. The polarizing conversion means of claim 1 wherein said beam splitter comprises a cubic polarizer having a pair of right angled prisms, the sloped surfaces thereof being provided with a dielectric laminated layer of alternating coatings of a high refractive index material and a low refractive index material, said sloped surfaces being secured together.

3. The polarizing conversion means of claim 1 wherein said polarizing beam splitter comprises a single glass plate, the angle of said light relative to a surface of said single glass plate comprising the angle of polarization of said light.

4. The polarizing conversion means of claim 1 wherein said polarizing beam splitter comprises a plurality of laminated, parallel glass plates, the angle of said light relative to a surface of said plurality of glass plates comprising the angle of polarization of said light.

5. The polarizing conversion means according to any one of the claims 1 through 4 wherein said polarizing changing means comprises a light reflector.

6. The projection type liquid crystal display system according to any one of claims 1 through 4 wherein said polarizing changing means comprises a λ/4 plate.

7. The projection type liquid crystal display system according to any one of claims 1 through 4 wherein said polarizing changing means comprises a λ/2 plate.

8. Polarization conversion and redirection system in an optical path for converting two polarized light components of different polarization direction into polarized light components having identical polarization direction for presentation at an objective plane having a planar receiving surface and comprising
    a beam splitter to separate incident light from a light source into two polarized light components each having different polarization directions and different optical component paths,
    polarizing changing means positioned in one of said component optical paths of one of said polarized light components to orient said one polarized light component to have the identical polarization direction as the other of said polarized light components in the other of said component optical paths,
    a prism reflector having two mirror surfaces meeting at a sharp acute angle, said prism mirror surfaces respectively receiving one of said directionally identical polarized light components to redirect said identical polarized light components in side-by-side and parallel relationship, and
    wherein the optical path length for both of said polarized light components between said light source and said objective plane are substantially equal to independently direct said directionally identical polarized light components to said objective plane with said directionally identical polarized light components incident on said objective plane surface in substantially perpendicular relationship.

9. A method of forming and projecting two polarized light components having the same polarization direction onto an objective plane comprising the steps of:
    splitting light from a light source into two polarized light components wherein said components from their point of origin have different polarization directions,
    directing said polarized light components along spatially separate component optical paths,
    converting the polarization direction of one of said polarized light components along its component optical path to match that of the other of said polarized light components,
    providing a prism shaped reflector having two side surface mirror surfaces formed at a sharp apex of said prism,
    redirecting said polarization matched polarized light components to reflect from said mirror surface and projecting said components along their respective component optical paths in substantially side-by-side, parallel relationship onto said objective plane spaced therefrom with said components incident therewith, and
    providing the length of the spatially separate component paths from the light source to the objective plane to be substantially identical.

10. An optical system for polarizing and synthesizing unpolarized light along an optical path from a light source for presentation at an objective plane comprising
    beam splitter means aligned in said optical path to receive said light from said light source for separating said light into two polarized light components having orthorgonally different polarization directions, reorientation means in said optical path to receive one of said polarized light components and convert said one polarized light component into a polarized light component having polarization direction identical to the other of said polarized light components, and reflection synthesis means to receive said directionally identical polarized light components along said optical path and reflect said directionally identical polarized light components in substantially juxtaposed and parallel relation for directing said directionally identical polarized light components along said optical path onto said objective plane and incident therewith, wherein the length of said optical path traversed by polarized light components between said light source and said objective plane are substantially identical.

11. The optical system of claim 10 wherein said reorientation means comprises a cubic polarizer or a plate polarizer and said reflection means comprises a pair of mirror surfaces.

12. The optical system of claim 11 wherein said reflection means is a prism mirror having two mirror surfaces meeting at a sharp acute angle.

13. Polarization conversion and optical redirecting system having an optical path for converting two polarized light components of different polarization direction into polarized light components having identical polarization direction for presentation at an objective plane having a planar receiving surface and comprising a beam splitter to receive light incident on a first surface and separate therein said light into two polarized light components each having different polarization directions, said beam splitter comprising two right angled prisms with their hypotenuse sides secured together forming a reflector, a first of said polarized light components reflected out of said beam splitter at said hypotenuse reflector through a second beam splitter surface at right angles to said incident light and directing it along a first optical path, a second of said polarized light components transmitted through said beam splitter to a third beam splitter surface opposite to said first surface, polarizing changing means formed on said third beam splitter surface to convert said second polarized light component to have the identical polarization direction as said first polarized light component and reflect said converted, second polarized light component at said hypotenuse reflector out of said beam splitter through a fourth beam splitter surface at right angles to said incident light and opposite to said second beam splitter surface and directing it along a second optical path, said first and second optical paths being defined as a path length between said hypotenuse reflector and said planar receiving surface and having substantially the same path length, and a prism reflector having first and second mirror surfaces meeting at a sharp acute angle, said first and second prism mirror surfaces respectively receiving via reflecting means said directionally identical first and second polarized light components in said first and second optical paths for redirecting said components in side-by-side and parallel relationship onto said planar receiving surface.

* * * * *